United States Patent
Wang

(10) Patent No.: US 9,675,981 B2
(45) Date of Patent: Jun. 13, 2017

(54) RESILIENTLY FLEXIBLE NOZZLE HEAD FOR INFLATOR

(71) Applicant: BETO ENGINEERING AND MARKETING CO., LTD., Taichung (TW)

(72) Inventor: Lopin Wang, Taichung (TW)

(73) Assignee: Beto Engineering and Marketing Co., Ltd., Taichung (TW)

( * ) Notice: Subject to any disclaimer, the term of this patent is extended or adjusted under 35 U.S.C. 154(b) by 2 days.

(21) Appl. No.: 14/923,988

(22) Filed: Oct. 27, 2015

(65) Prior Publication Data
US 2017/0056895 A1    Mar. 2, 2017

(30) Foreign Application Priority Data
Aug. 28, 2015 (TW) .............................. 104128503 A

(51) Int. Cl.
| | |
|---|---|
| B05B 1/00 | (2006.01) |
| F04B 33/00 | (2006.01) |
| F04B 53/10 | (2006.01) |
| F16K 27/12 | (2006.01) |
| B60S 5/04 | (2006.01) |
| F04B 39/12 | (2006.01) |
| F16K 11/044 | (2006.01) |

(52) U.S. Cl.
CPC ............ B05B 1/005 (2013.01); B60S 5/04 (2013.01); F04B 33/005 (2013.01); F04B 39/121 (2013.01); F04B 53/10 (2013.01); F16K 11/044 (2013.01); F16K 27/12 (2013.01)

(58) Field of Classification Search
CPC ...... F16K 11/044; F16K 11/056; F16K 15/20; F16K 27/12; F16K 31/44; B60C 29/06; B60C 29/064; B60S 5/04; F04B 33/005; F04B 39/121
USPC .................................. 137/223, 231; 152/415
See application file for complete search history.

(56) References Cited

U.S. PATENT DOCUMENTS

| | | | | |
|---|---|---|---|---|
| 3,926,205 A | * | 12/1975 | Gourlet ................... | F16L 37/05 137/223 |
| 5,379,796 A | * | 1/1995 | Wang ........................ | B60S 5/04 137/231 |
| 5,638,865 A | * | 6/1997 | Wu ..................... | F16K 11/0876 137/223 |
| 5,921,269 A | * | 7/1999 | Wu ........................... | B60S 5/04 137/223 |
| 5,960,815 A | * | 10/1999 | Wang .................... | F04B 33/005 137/118.03 |

(Continued)

*Primary Examiner* — Mary McManmon
*Assistant Examiner* — Richard K Durden
(74) *Attorney, Agent, or Firm* — Muncy, Geissler, Olds & Lowe, P.C.

(57) ABSTRACT

A flexible nozzle head for an inflator includes a head-end housing, having an accommodating space for accommodating a nozzle head component; a pump-end housing, being fixedly connected to one end of a pump body of the inflator; and a hose, having one end airtightly overmolded with the head-end housing as an integer and having an opposite end airtightly connected to the pump-end housing. The head-end housing has a through hole communicated with the accommodating space and an axial channel of the hose. The pump-end housing has an interior thereof communicated with the axial channel of the hose.

4 Claims, 11 Drawing Sheets

(56) References Cited

U.S. PATENT DOCUMENTS

| | | | | | |
|---|---|---|---|---|---|
| 6,105,600 | A * | 8/2000 | Wang | ........................ | B60S 5/04 137/223 |
| 6,202,714 | B1 * | 3/2001 | Wang | ........................ | B60S 5/04 141/301 |
| 6,220,274 | B1 * | 4/2001 | Wang | .................. | F16K 31/5245 137/231 |
| 6,276,405 | B1 * | 8/2001 | Wang | .................... | F04B 33/005 141/38 |
| 6,289,920 | B1 * | 9/2001 | Wang | ........................ | B60S 5/04 137/223 |
| 6,328,057 | B1 * | 12/2001 | Wang | ...................... | F16L 37/18 137/223 |
| 6,978,796 | B2 * | 12/2005 | Ostrowiecki | ....... | F16K 17/0413 137/223 |
| 7,866,335 | B2 * | 1/2011 | Wang | ...................... | F16K 15/20 137/223 |
| 8,336,386 | B2 * | 12/2012 | Wang | .................... | F04B 33/005 73/700 |
| 8,360,090 | B2 * | 1/2013 | Wang | .................... | F16K 11/056 137/119.06 |
| 9,016,304 | B2 * | 4/2015 | Wang | ...................... | F16K 15/20 137/223 |
| 2003/0221724 | A1 * | 12/2003 | Wang | ........................ | B60S 5/04 137/223 |
| 2006/0060672 | A1 * | 3/2006 | Wang | .................... | F04B 33/005 239/526 |
| 2012/0080099 | A1 * | 4/2012 | Wang | ...................... | B60S 5/043 137/223 |
| 2012/0171053 | A1 * | 7/2012 | Wang | .................... | F04B 33/005 417/63 |
| 2012/0234401 | A1 * | 9/2012 | Wu | ........................ | F16L 37/00 137/231 |
| 2013/0183180 | A1 * | 7/2013 | Wang | ...................... | F04B 33/00 417/437 |

\* cited by examiner

RESILIENTLY FLEXIBLE NOZZLE HEAD FOR INFLATOR

BACKGROUND OF THE INVENTION

1. Technical Field

The present invention relates to inflators and more particularly to a flexible nozzle head for an inflator.

2. Description of Related Art

The conventional portable inflator (aka mini pump) to be carried with a bicycle typically has its head and pump body integrated as an integer. Such an inflator when used to inflate a tire tends to pull the tire's valve and consequently have its head come off from the tire's valve or tear the tier's inner tube at where its head connects.

For solving the foregoing problem, an improvement has been made to the known inflator. Therein, the inflator's head is attached to a hose, and the hose is embedded in a pump body of the inflator. The head is drawn outward for use and retracted into the inflator's pump body for storage. While such a configuration does prevents the foregoing problem, it is not perfect because for receiving the hose, the pump body has to be provided with an additional inner tube that occupies space in the pump body and reduces the inflator's effective inflating capacity since the inner tube solely functioning for receiving the hose and but not forming a part of the cylinder that forms compressed air. Thus, such an inflator is even inferior to the traditional ones in terms of inflating efficiency.

SUMMARY OF THE INVENTION

The primary objective of the present invention is to provide a nozzle head for an inflator. The nozzle head is resiliently flexible, so that when used to inflate a tire, it is unlikely to pull the tire's valve. Also, the nozzle head takes no space in the pump body (cylinder) of the inflator, thereby ensuring good inflating efficiency.

For achieving the foregoing objective, the disclosed flexible nozzle head for an inflator comprises a head-end housing, having an accommodating space for accommodating a nozzle head component; a pump-end housing, being fixedly connected to one end of a pump body of the inflator; and a hose, having one end airtightly overmolded with the head-end housing as an integer and having an opposite end airtightly connected to the pump-end housing. The head-end housing has a through hole communicated with the accommodating space and an axial channel of the hose. The pump-end housing has an interior thereof communicated with the axial channel of the hose.

DETAILED DESCRIPTION OF THE INVENTION

Figure 1:
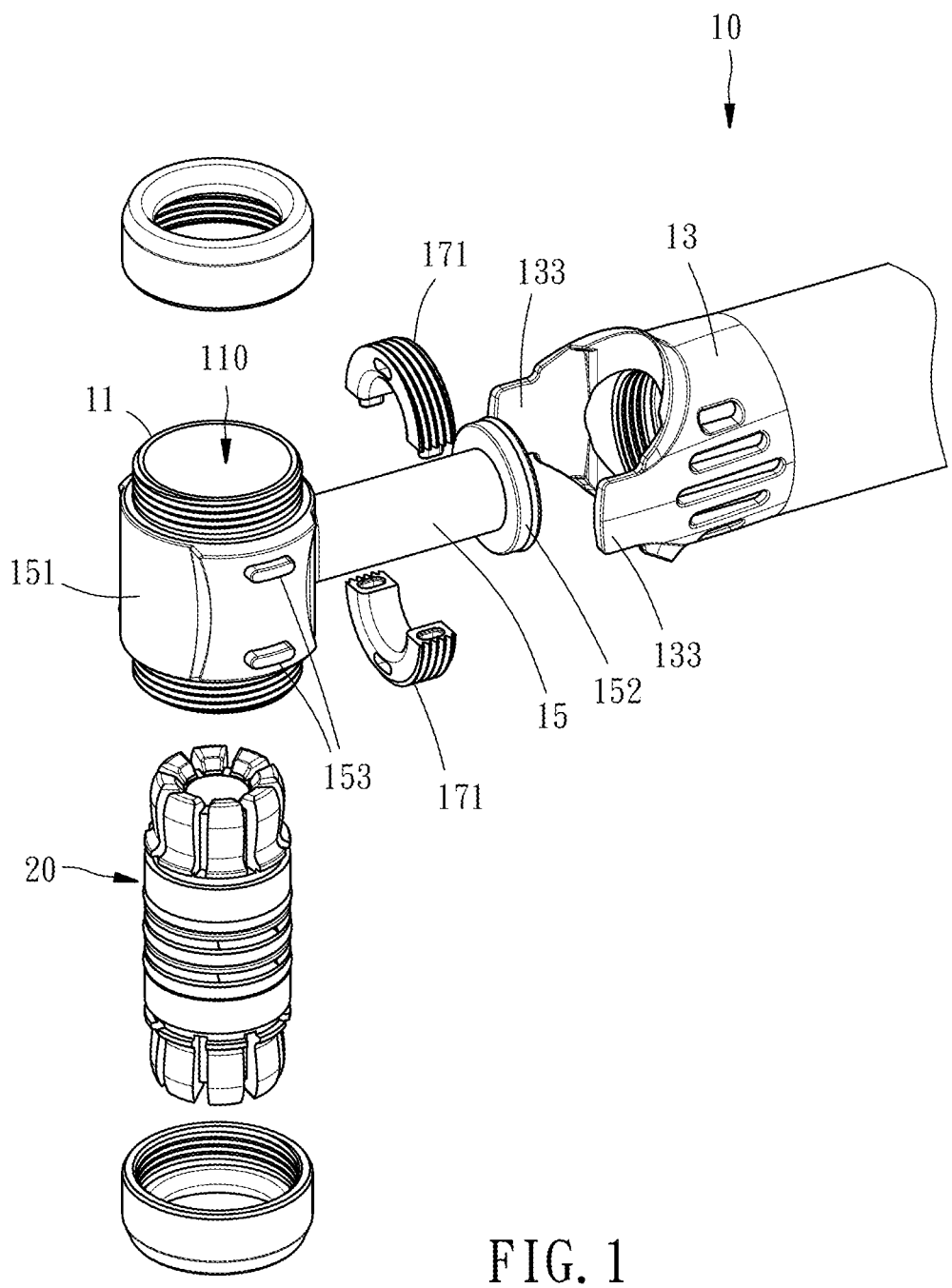
FIG. 1 is an exploded view of a nozzle head according to a first embodiment of the present invention.

Three embodiments are herein described with reference of the accompanying drawings for illustrating the present invention.

As shown in FIG. 1 through FIG. 5, in the first embodiment of the present invention, the nozzle head 10 comprises a head-end housing 11, a pump-end housing 13, and a hose 15.

The head-end housing 11 defines thereon an accommodating space 110 for receiving a nozzle head component 20. The nozzle head component 20 may be any of various structures as known in the art and is not described in detail herein. The nozzle head component used in the second embodiment of the present invention, which will be discussed later, is of another known form, and unnecessary explanation will also be omitted.

Figure 6:
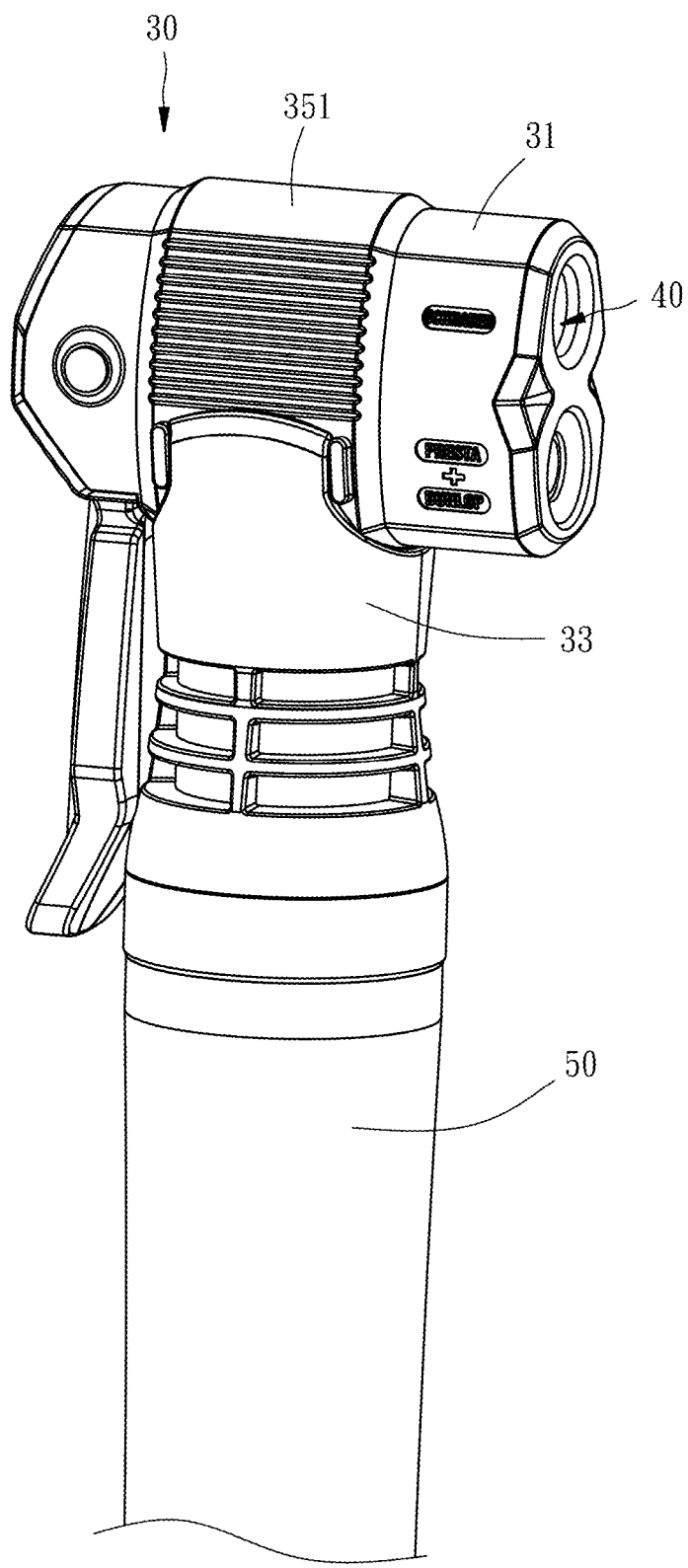
FIG. 6 is a perspective view of a nozzle head according to a second embodiment of the present invention, which is in a retracted state.
Figure 7:
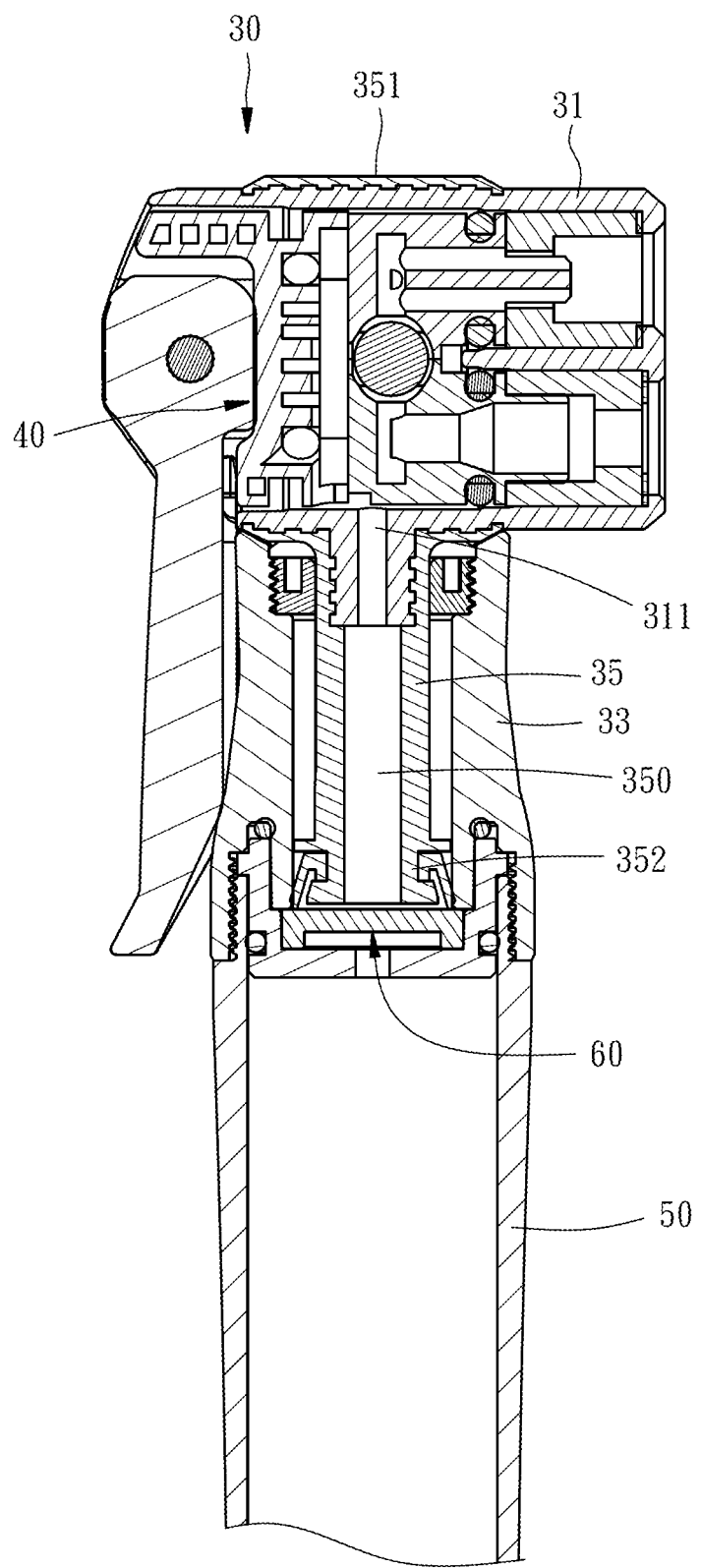
FIG. 7 is a cross-sectional view of FIG. 6.
Figure 8:
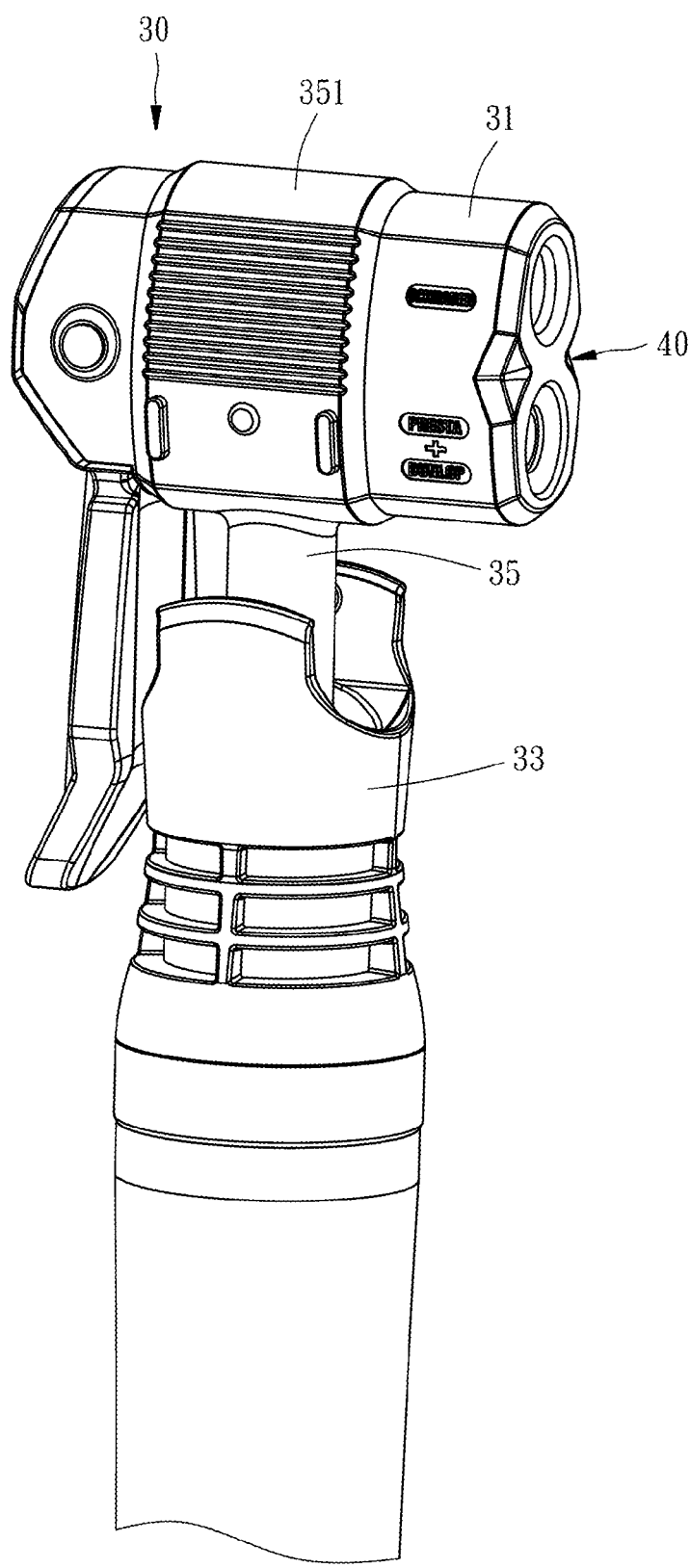
FIG. 8 is a perspective view of the nozzle head of FIG. 6, which is in a use (expanded) state.
Figure 9:
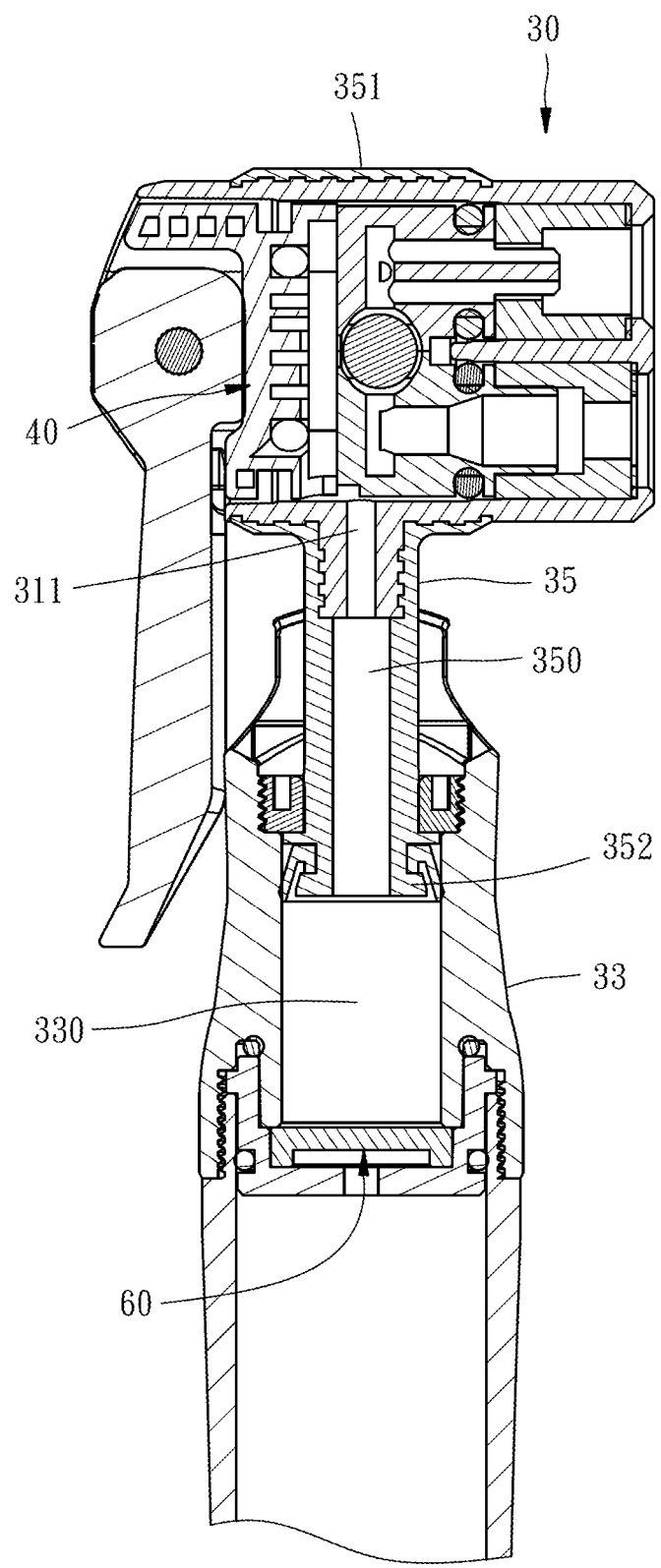
FIG. 9 is a cross-sectional view of FIG. 8.

The pump-end housing 13 is fixed to one end of a pump body of the inflator (not shown for the present embodiment, and as shown in FIG. 6 and FIG. 7 for the second embodiment).

The hose 15 has one end 151 airtightly overmolded with the head-end housing 11 as an integer and has an opposite end 152 airtightly connected to the pump-end housing 13. The head-end housing 11 has a through hole 111 communicated with its accommodating space 110 and an axial channel 150 of the hose 15. The interior of the pump-end housing 13 is communicated with the hose's axial channel 150.

The pump-end housing 13 is toughly tubular with one end 131 fixedly connected to the pump body of the inflator and an opposite end 132 formed with an inward extended receiving cavity 130. The hose 15 has its opposite end 152 provided with an enlarged outer diameter, namely an end portion 152. The end portion 152 is received in the receiving cavity 130 of the pump-end housing 13. In addition, a retaining member 17 is mounted around the opposite end 132 of the pump-end housing 13 so as to retain the end portion 152 of the hose 15 in the receiving cavity 130 of the pump-end housing 13.

The retaining member 17 is composed of two semiannular members 171 combined into a ring. The ring centrally defines a through hole for the hose 15 to pass therethrough. The hose 15 has its end portion 152 movable in the receiving cavity 130 of the pump-end housing 13. The end portion 152 of the hose 15 peripherally contacts the inner wall of the receiving cavity 130 of the pump-end housing 13 in an airtight manner.

The pump-end housing 13 has its opposite end 132 extended outward to form two shoulders 133. The head-end housing 11 is held and positioned between the two shoulders 133. In the present embodiment, at each lateral sides of the molded end portion 151 of the hose 15, there are two lugs 153 for positioning the corresponding shoulder 133 of the pump-end housing 13.

Figure 2:
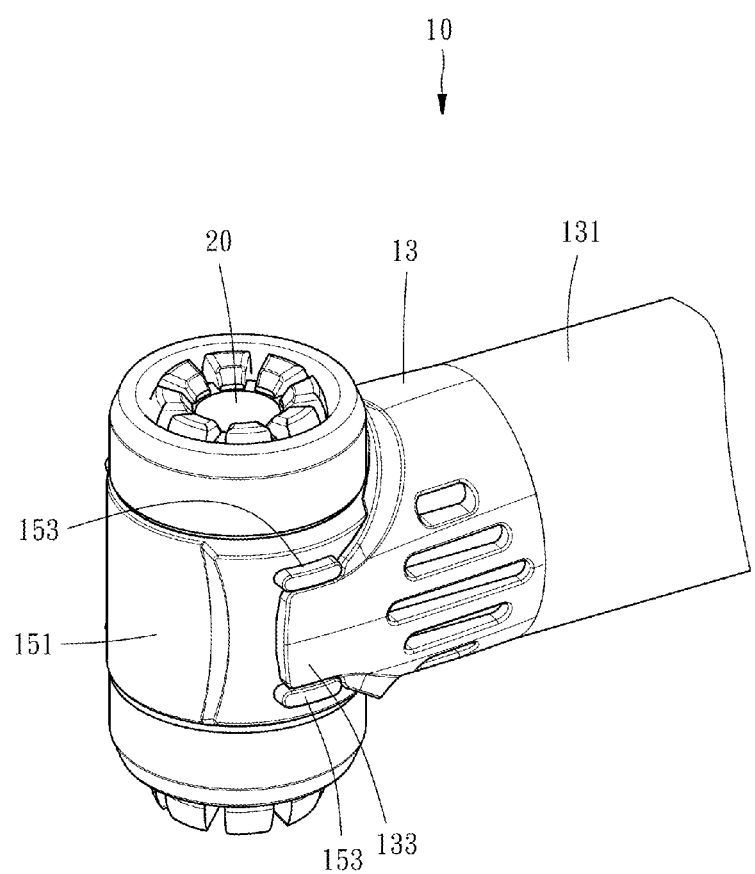
FIG. 2 is a perspective view of the nozzle head of FIG. 1, which is in a retracted state.
Figure 3:
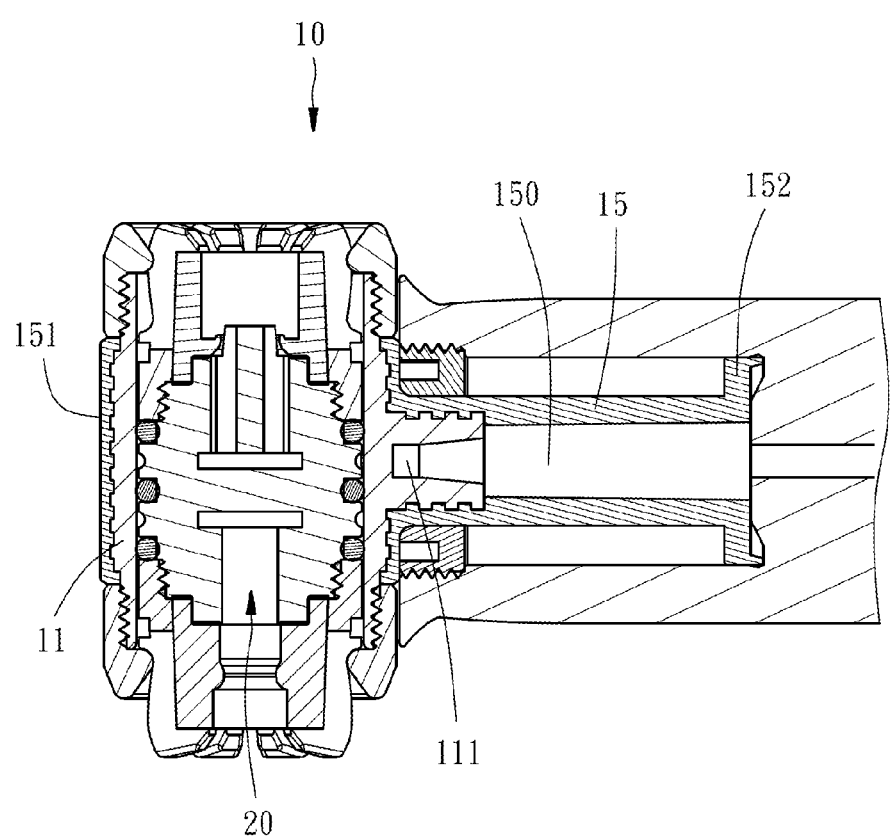
FIG. 3 is a cross-sectional view of FIG. 2.
Figure 4:
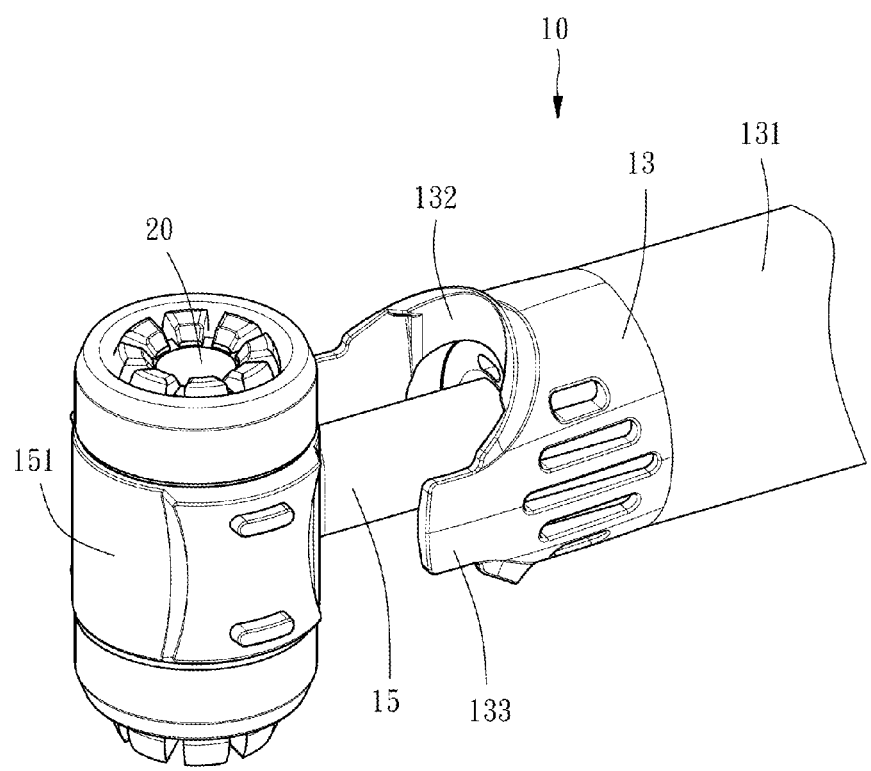
FIG. 4 is a perspective view of the nozzle head of FIG. 1, which is in a use (expanded) state.
Figure 5:
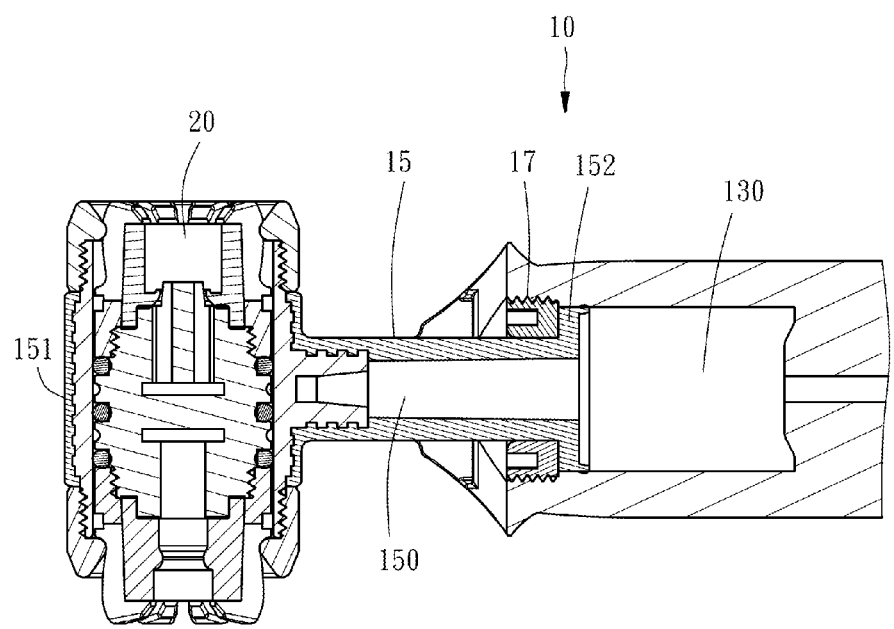
FIG. 5 is a cross-sectional view of FIG. 4.

Referring to FIG. 2 and FIG. 3, for storage, the head-end housing 11 is pushed toward the pump-end housing 13 so as to be held and positioned by the two shoulders 133. For use, the head-end housing 11 is drawn outward, as shown in FIG. 4 and FIG. 5. At this time, the head-end housing 11 and the pump-end housing 13 are connected through the hose 15 in a way that the head-end housing 11 is resiliently flexible and can turn in all directions. This prevents the tire's valve from getting pulled by the inflator under operation.

As shown in FIGS. 6 through 9, in the second embodiment of the present invention, the nozzle head 30 comprises a head-end housing 31 having an accommodating space for accommodating a nozzle head component 40; a pump-end housing 33 fixedly connected to one end of the inflator's pump body 50; and a hose 35 having one end 351 airtightly overmolded with the head-end housing 31 as an integer and an opposite end 352 airtightly connected to the pump-end housing 33. The head-end housing 31 has a through hole 311 communicated with its accommodating space and the axial channel 350 of the hose 35. The pump-end housing 33 has a receiving cavity 330 communicated with the axial channel 350 of the hose 35. In the present embodiment, a check valve 60 is attached to one end of the pump-end housing 33 that is fixedly connected to the inflator pump body 50.

Figure 10:
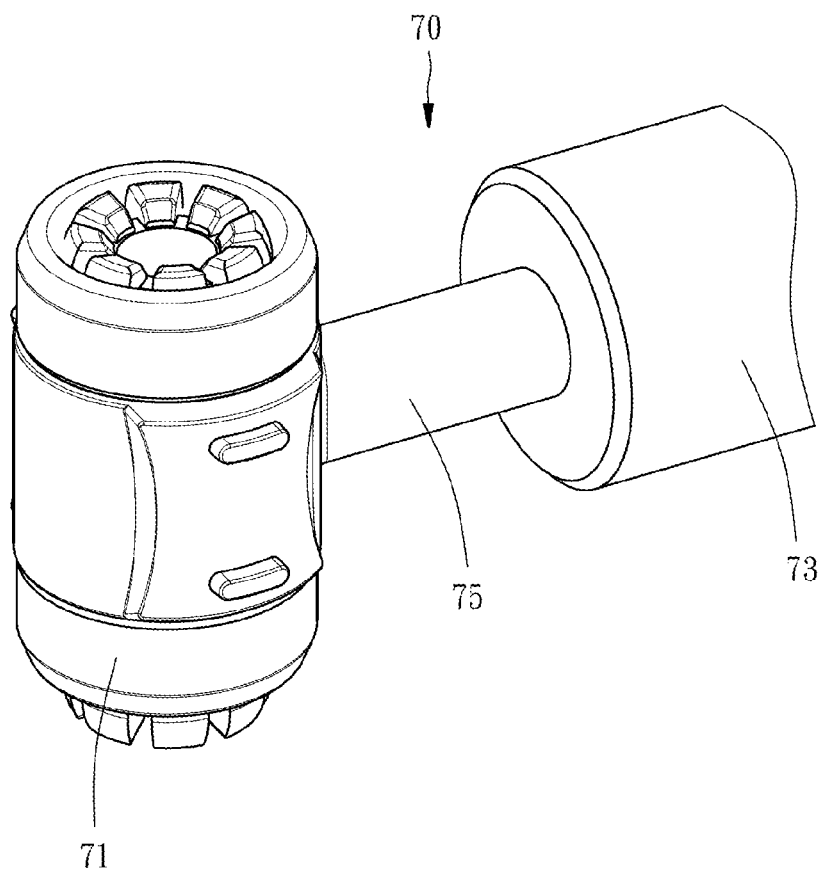
FIG. 10 is a perspective view of a nozzle head according to a third embodiment of the present invention.
Figure 11:
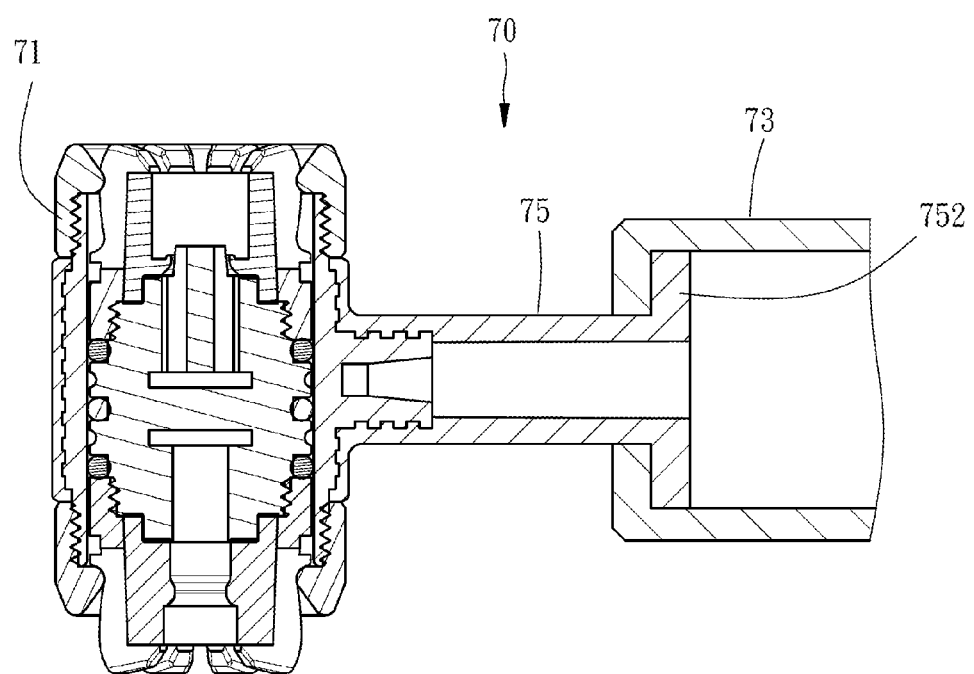
FIG. 11 is a cross-sectional view of FIG. 10.

Referring to FIG. 10 and FIG. 11, in the third embodiment of the present invention the nozzle head 70 comprises a head-end housing 71; a pump-end housing 73; and a hose 75. It is distinctive as the hose 75 also has its opposite end 752 airtightly overmolded with the pump-end housing 73 as an integer.

The present invention implements a simple and compact structure to enable the nozzle head to be resiliently flexible, without compromising inflating efficiency, so is an inventively improved creation.

What is claimed is:

1. A flexible nozzle head for an inflator, the nozzle head comprising:
   a head-end housing, having an accommodating space for accommodating a nozzle head component;
   a pump-end housing, being fixedly connected to one end of a pump body of the inflator; and
   a hose, having one end airtightly enclosed around a middle section of the head-end housing and having an opposite end airtightly connected to the pump-end housing, the head-end housing having a through hole communicated with the accommodating space and an axial channel of the hose, and the pump-end housing having an interior thereof communicated with the axial channel of the hose;
   wherein the pump-end housing is tubular with one end fixedly connected to the pump body of the inflator and an opposite end formed with a receiving cavity extending inward, the opposite end of the hose is an end portion with an enlarged outer diameter, the end portion being received in the receiving cavity of the pump-end housing, and a retaining member being provided at the opposite end of the pump-end housing for retaining the end portion of the hose within the receiving cavity of the pump-end housing;
   wherein the hose has its end portion movable in the receiving cavity of the pump-end housing;
   wherein the end portion of the hose peripherally contacts the inner wall of the receiving cavity of the pump-end housing in an airtight manner.

2. The nozzle head of claim 1, wherein a check valve is attached to one end of the pump-end housing that is fixedly connected to the inflator.

3. The nozzle head of claim 1, wherein the retaining member is formed by two semiannular members combined into a ring, the ring centrally defining a through hole for the hose to pass therethrough.

4. The nozzle head of claim 1, wherein the opposite end of the pump-end housing extends outward to form two shoulders for holding and positioning the head-end housing therebetween.

* * * * *